US011001300B2

(12) United States Patent
Kumano et al.

(10) Patent No.: US 11,001,300 B2
(45) Date of Patent: May 11, 2021

(54) DRIVING SUPPORT SYSTEM

(71) Applicant: DENSO CORPORATION, Kariya (JP)

(72) Inventors: Shunya Kumano, Nisshin (JP);
Shunsuke Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 16/184,152

(22) Filed: Nov. 8, 2018

(65) Prior Publication Data
US 2019/0135341 A1    May 9, 2019

(30) Foreign Application Priority Data
Nov. 9, 2017  (JP) .............................. JP2017-216364

(51) Int. Cl.
| | | |
|---|---|---|
| *B62D 15/02* | (2006.01) | |
| *G06T 7/00* | (2017.01) | |
| *G08G 1/16* | (2006.01) | |
| *B60T 7/22* | (2006.01) | |
| *G06T 7/13* | (2017.01) | |
| *G06T 7/90* | (2017.01) | |
| *B60R 1/00* | (2006.01) | |
| *G01C 21/36* | (2006.01) | |

(52) U.S. Cl.
CPC .............. *B62D 15/025* (2013.01); *B60R 1/00* (2013.01); *G01C 21/3602* (2013.01); *G01C 21/3658* (2013.01); *G06T 7/13* (2017.01); *G06T 7/90* (2017.01); *B60R 2300/30* (2013.01); *B60R 2300/804* (2013.01); *G06T 2207/30252* (2013.01); *G06T 2207/30256* (2013.01)

(58) Field of Classification Search
CPC . G06K 9/00; G06K 9/46; B62D 15/02; G08G 1/16; G05D 1/00; G06F 7/00; H04N 9/04; H04N 7/18; G06T 7/00
See application file for complete search history.

(56) References Cited

U.S. PATENT DOCUMENTS

| | | | | |
|---|---|---|---|---|
| 8,472,673 B2 * | 6/2013 | Kuehnle | ............ | G06K 9/00798 |
| | | | | 382/104 |
| 8,543,254 B1 * | 9/2013 | Schut | ........................ | B60T 7/22 |
| | | | | 348/135 |

(Continued)

FOREIGN PATENT DOCUMENTS

| | | | | | |
|---|---|---|---|---|---|
| CN | 107145824 A | * | 9/2017 | ............... | G06K 9/00 |
| CN | 107292214 A | * | 10/2017 | ............... | G06K 9/00 |
| JP | 2009-230233 A | | 10/2009 | | |

*Primary Examiner* — Yuri Kan, P.E.
(74) *Attorney, Agent, or Firm* — Maschoff Brennan (57) ABSTRACT

The driving support system extracts edge points based on luminance of pixels, in which up edge point is the edge point where the luminance of the inner pixel is smaller than that of the outer pixel, down edge point is the edge point where the luminance of the outer pixel is smaller than the luminance of inner pixel. The system determines, among a plurality of line candidates acquired in accordance with the edge points location, a lane candidate excluding the line candidate that satisfies a predetermined exclusion condition, to be the lane marking, the line candidate determined as the lane marking being located most closely to the vehicle position. The exclusion condition includes a condition where the number of edge points of the up edge line is larger than or equal to a predetermined point threshold, compared to the number of edge points of the down edge line.

10 Claims, 9 Drawing Sheets

(56) References Cited

U.S. PATENT DOCUMENTS

| | | | | |
|---|---|---|---|---|
| 2009/0010482 A1* | 1/2009 | Nishida | ............ | G06T 7/12 |
| | | | | 382/100 |
| 2011/0007163 A1* | 1/2011 | Sakurai | ............ | G08G 1/167 |
| | | | | 348/148 |
| 2012/0072080 A1* | 3/2012 | Jeromin | ............ | G06K 9/2018 |
| | | | | 701/49 |
| 2013/0266175 A1* | 10/2013 | Zhang | ............ | G06T 7/12 |
| | | | | 382/100 |
| 2013/0321630 A1* | 12/2013 | Shin | ............ | G08G 1/167 |
| | | | | 348/148 |
| 2014/0184800 A1* | 7/2014 | Hirai | ............ | H01L 27/14621 |
| | | | | 348/148 |
| 2015/0279017 A1* | 10/2015 | Tamura | ............ | H04N 13/239 |
| | | | | 382/103 |

\* cited by examiner

DRIVING SUPPORT SYSTEM

CROSS-REFERENCE TO RELATED APPLICATION

This application is based on and claims the benefit of priority from earlier Japanese Patent Application No. 2017-216364 filed Nov. 9, 2017, the description of which is incorporated herein by reference.

BACKGROUND

Technical Field

The present disclosure relates to a driving support system.

Description of the Related Art

A driving support system is known in which the system recognizes a lane marking that represents a boundary of a traffic lane where the vehicle travels based on the luminance of an image captured by an on-vehicle camera mounted to the vehicle to be oriented ahead of the travelling direction of the vehicle, and controls the steering of the vehicle such that the vehicle runs along the recognized lane marking.

However, according to this type of driving support system, when a buffering zone is present in a travelling direction of the vehicle, the buffering zone is recognized as a lane marking so that a detection accuracy of the location of the lane marking boundary may be lowered. In order to improve the detection accuracy, the system is required to differentiate the markings whether a line constitutes the lane marking or the buffering zone.

For example, patent literature, JP-A-2009-230233 discloses a technique in which the captured image captured by the on-vehicle camera is converted to a bird's eye view image and the marking is determined whether a line constitutes the buffering zone, by using a width of a zebra shape represented by the markings existing in the converted image.

However, to recognize the buffering zone with this method, since it is required to convert the captured image into the bird's eye view image so as to calculate the width of the zebra shape represented by the markings, processing load of the converting process into bird's eye view may increase.

SUMMARY

The present disclosure provides a technique which reduces a processing load for recognizing a buffering zone and recognizes a position of a lane marking.

An aspect of the present disclosure is a driving support system mounted on a vehicle, controlling a steering of the vehicle based on a lane marking indicating a boundary of an own lane where the vehicle is travelling, including an edge point extraction unit, an edge line calculation unit, a line candidate extraction unit, a determining unit and a control unit.

The edge point extraction unit is configured to extract an edge point, in which a scanning direction is defined as a direction corresponding to a vehicle width direction in a captured image where a road surface ahead of the vehicle is captured, a luminance difference is defined as a difference between luminance of adjacent pixels in a pixel column which is pixels arranged along the scanning direction, and the edge point is defined as the adjacent pixels having an absolute value of the luminance difference which is larger than a predetermined luminance threshold. The edge line calculation unit is configured to calculate an up edge line and a down edge line, in which a vehicle position is defined as a position of the vehicle in the captured image, an outer pixel is defined as a pixel located in a far side from the vehicle position with respect to the edge point, and an inner pixel is defined as a pixel located in a near side from the vehicle position with respect to the edge point, an up edge point is defined as the edge point where the luminance of the inner pixel is smaller than the luminance of the outer pixel, a down edge point is defined as the edge point where the luminance of the outer pixel is smaller than the luminance of inner pixel, the edge line calculation unit calculates the up edge line which is an approximation line of a distribution of a plurality of up edge points and the down edge line which is an approximation line of a distribution of a plurality of down edge points. The line candidate extraction unit is configured to extract an area surrounded by the up edge line and the down edge line which are adjacent to each other to be a line candidate, the adjacent up edge line being located closer to the vehicle position than the adjacent down edge line. The determining unit is configured to determine a lane marking among a plurality of line candidates excluding line candidates that satisfy a predetermined exclusion condition, the lane marking being the line candidate located most closely to the vehicle position along the vehicle width direction as a line indicating a position and a shape of a boundary of a traffic lane. The control unit is configured to perform steering control of the vehicle such that the vehicle travels along the position and the shape of the lane marking determined by the determining unit, in which the exclusion condition includes a condition where the number of edge points belonging to the up edge line constituting the line candidate is larger than or equal to a predetermined point threshold, compared to the number of edge points belonging to the down edge line constituting the line candidate.

The exclusion condition includes a condition where the number of edge points belonging to the up edge line constituting the line candidate is larger than or equal to a predetermined point threshold, compared to the number of edge points belonging to the down edge line constituting the line candidate.

According to the above-described configuration, a processing load for recognizing a buffering zone can be reduced and a position of a lane marking can be recognized. Note that, the reference numerals in parentheses described in this column and claims indicate the corresponding relationship between the specific means described in the following embodiments as an aspect, and do not limit the technical range of the present invention.

DETAILED DESCRIPTION OF THE PREFERRED EMBODIMENTS

With reference to the drawings, embodiments of the present disclosure will be described. First, the configuration of a driving support system 1 shown in FIG. 1 will be described. The driving support system 1 is provided with an on-vehicle camera 10, sensors 20, a driving support apparatus 30, a control ECU 40 and a car navigation system 50. The driving support system 1 performs vehicle control such as a steering control of the vehicle.

Figure 1:
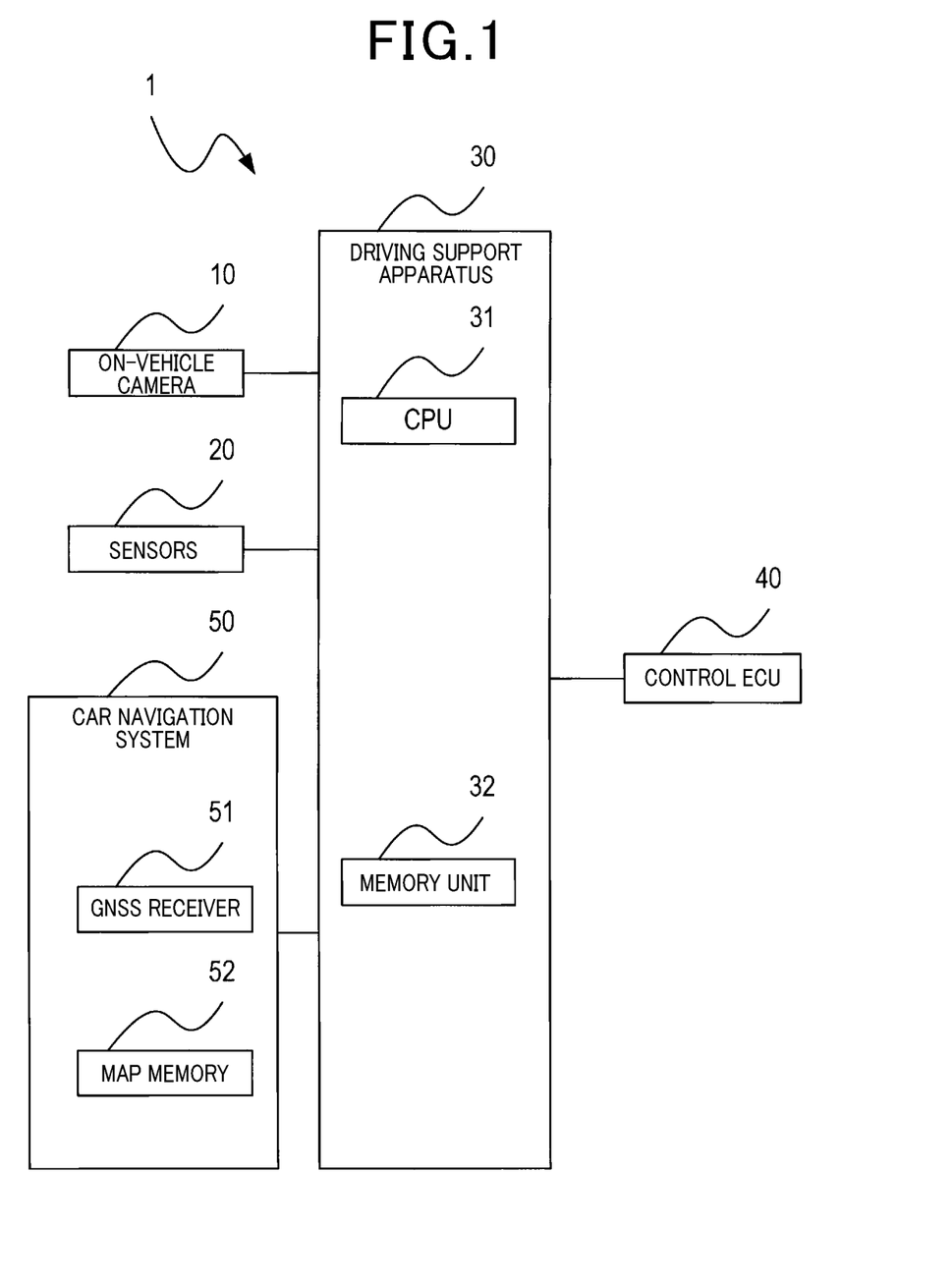
FIG. 1 is a block diagram showing a configuration of a driving support system according to an embodiment of the present disclosure.
Figure 2:
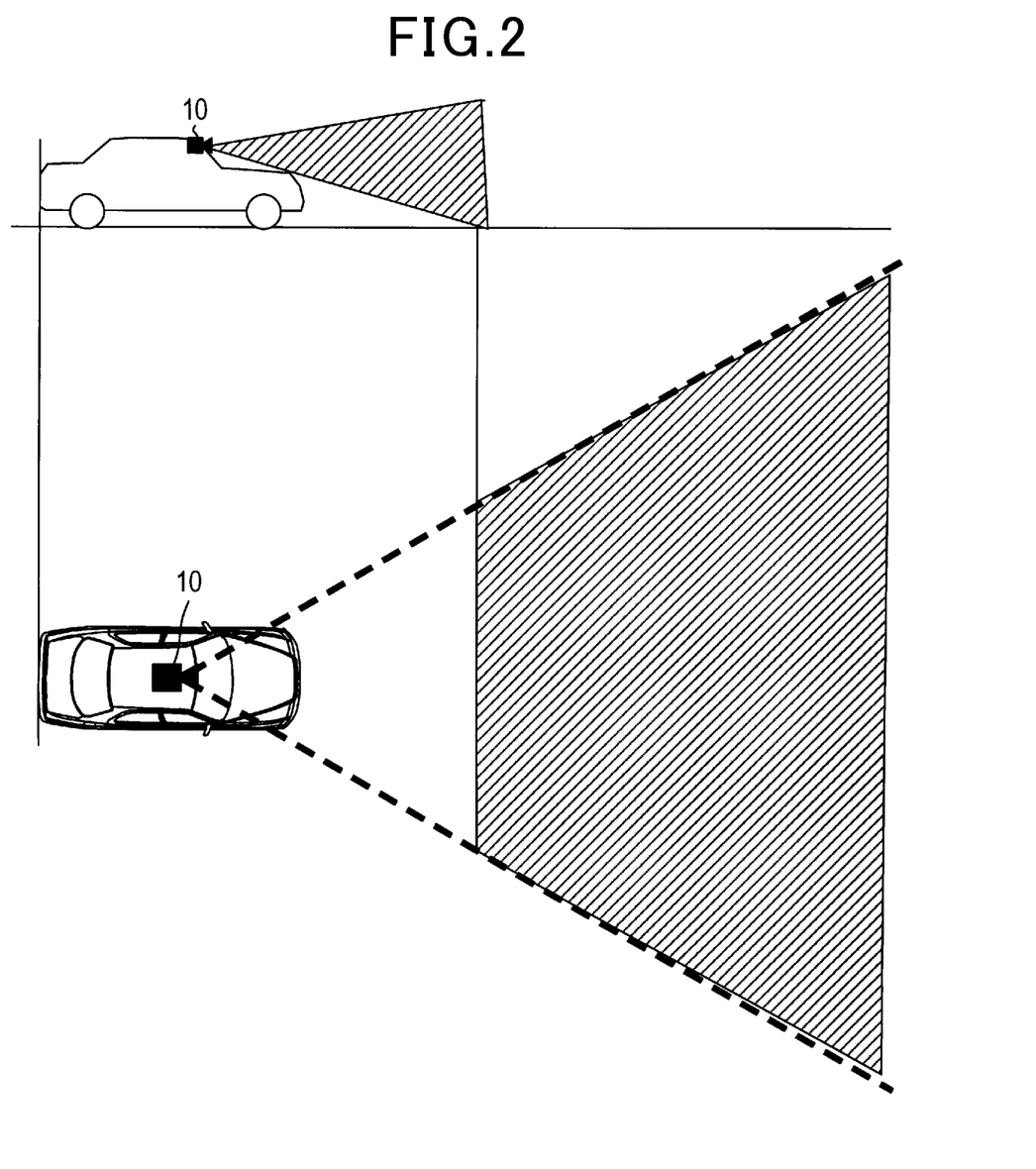
FIG. 2 is a diagram showing a capturing range of an on-vehicle camera.

The on-vehicle camera 10 is configured of a known CCD camera or CMOS camera provided with an image sensor in which CCD or CMOS imaging elements are two-dimensionally arranged. The on-vehicle camera 10 is configured to supply the driving support apparatus 30 with a captured image in which a region ahead of the vehicle is captured at a predetermined capturing period. Specifically, the on-vehicle camera 10 is attached to a center front side of the own vehicle, and captures an area ahead of the own vehicle in a predetermined angle range. Note that the captured image captured by the on-vehicle camera 10 is a color image from which the color can be identified, including color information indicating color to be displayed for each pixel.

The sensors 20 are various sensors mounted on the own vehicle to detect state and behavior of the own vehicle, including at least a vehicle speed sensor and a yaw rate sensor. The sensors 20 include at least a radar sensor. The sensors 20 may include a pitch angle sensor, a steering angle sensor other than the above-mentioned vehicle speed sensor, yaw rate sensor and radar sensor.

The control ECU 40 controls the own vehicle in accordance with information about a position and a shape of the lane marking of the own lane outputted from the driving support apparatus 30. Here, the own lane refers to a traffic lane where the own vehicle travels. Also, the lane marking refers to a line indicating a position of the boundary of the traffic lane and the shape of the traffic lane. The control of the own vehicle includes, for example, a control of notifying a driver of the own vehicle with an alert sound, and a known lane keeping control that controls a steering.

The car navigation system 50 includes a GNSS (global navigation satellite system) receiver 51 and a map memory 52, and generates, based on the position data of the own vehicle, information about a travelling route which is a route for the destination set by the driver of the own vehicle and the traffic lane used for travelling the traveling route.

The GNSS receiver 51 is an apparatus that receives radio waves transmitted from the GNSS satellite via the antenna. The GNSS receiver 51 measures an absolute position of the own vehicle and converts it to position data.

The map memory 52 stores map data of the road in which the own vehicle is able to travel. The map data is used for ordinary navigation, and at least includes information about a straight exclusive lane, a right-turn exclusive lane, and a left-turn exclusive lane.

The driving support apparatus 30 is mainly configured of a known microcomputer composed of semiconductor devices including CPU 31 and memory unit 32 composed of flash memory such as RAM and ROM. Various functions of the driving support apparatus are accomplished by a program stored in a non-transitory tangible recording media. In this example, the memory unit 32 corresponds to the non-transitory tangible recording media. By executing the program, a method corresponding to the program is executed. Note that the number of microcomputers is not limited to one, but a plurality of microcomputers may be utilized.

The driving support apparatus 30 accomplishes a driving support process which will be described later by executing the program with the CPU 31. The method for accomplishing various functions of the driving support apparatus 30 is not limited to software, but one or more hardware units may be used for a part of or whole elements. For example, when the above-mentioned functions are accomplished by electronic circuits as a hardware unit, the electronic circuits may be accomplished by a digital circuit including logic circuits or an analog circuit, or a combination thereof.

Figure 3:
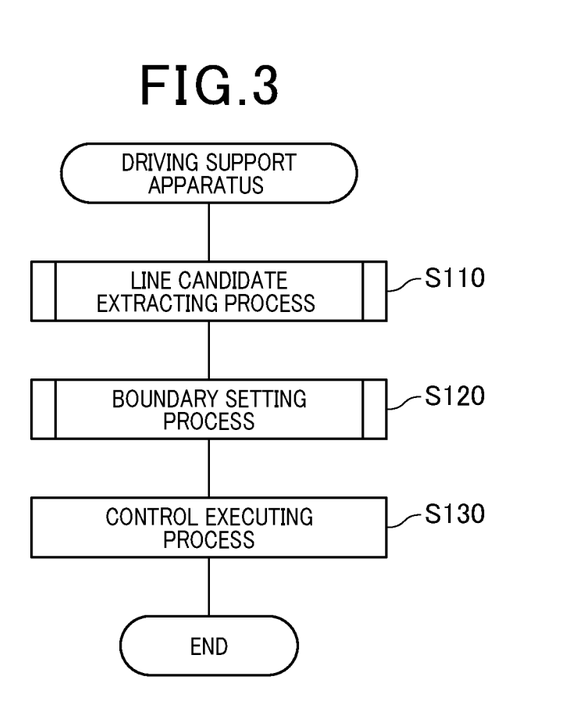
FIG. 3 is a flowchart showing a driving support process.

With reference to a flowchart shown in FIG. 3, a driving support process executed by the driving support apparatus 30 will be described. The driving support process is activated when the ignition switch of the own vehicle is turned ON and repeatedly executed until the ignition switch is turned OFF. Note that the period for executing the driving support process is not limited to a period during which the ignition switch is ON. For example, a switch may be provided in a position where the driver of the own vehicle is able to operate to determine whether the driving support is executed, and the driving support process may be executed while the switch is turned ON. Note that the process executed at one period prior to the current driving support process is referred to a previous driving support process in the driving support processes repeatedly executed.

At S1100, the driving support apparatus 30 executes a line candidate extracting process. The line candidate extracting process extracts specific line candidates representing a boundary of the traffic lane included in the captured image. At step S120, the driving support apparatus 30 perform a boundary setting process. The boundary setting process sets a specific line candidate that satisfies a predetermined condition among the specific line candidates extracted at step S110 to be a setting line candidate representing a lane boundary of the own lane.

At step S130, the driving support apparatus 30 executes a control executing process and terminates the driving support process. The control executing process allows the control ECU 40 to control the own vehicle based on a location of the lane boundary represented by the setting line candidates set at step S120.

Note that step S120 corresponds to a process of a determining unit and step S130 corresponds to a process of the control unit. Next, with reference to a flowchart shown in FIG. 4, the line candidate extracting process executed by the driving support process at step S110 will be described.

Figure 4:
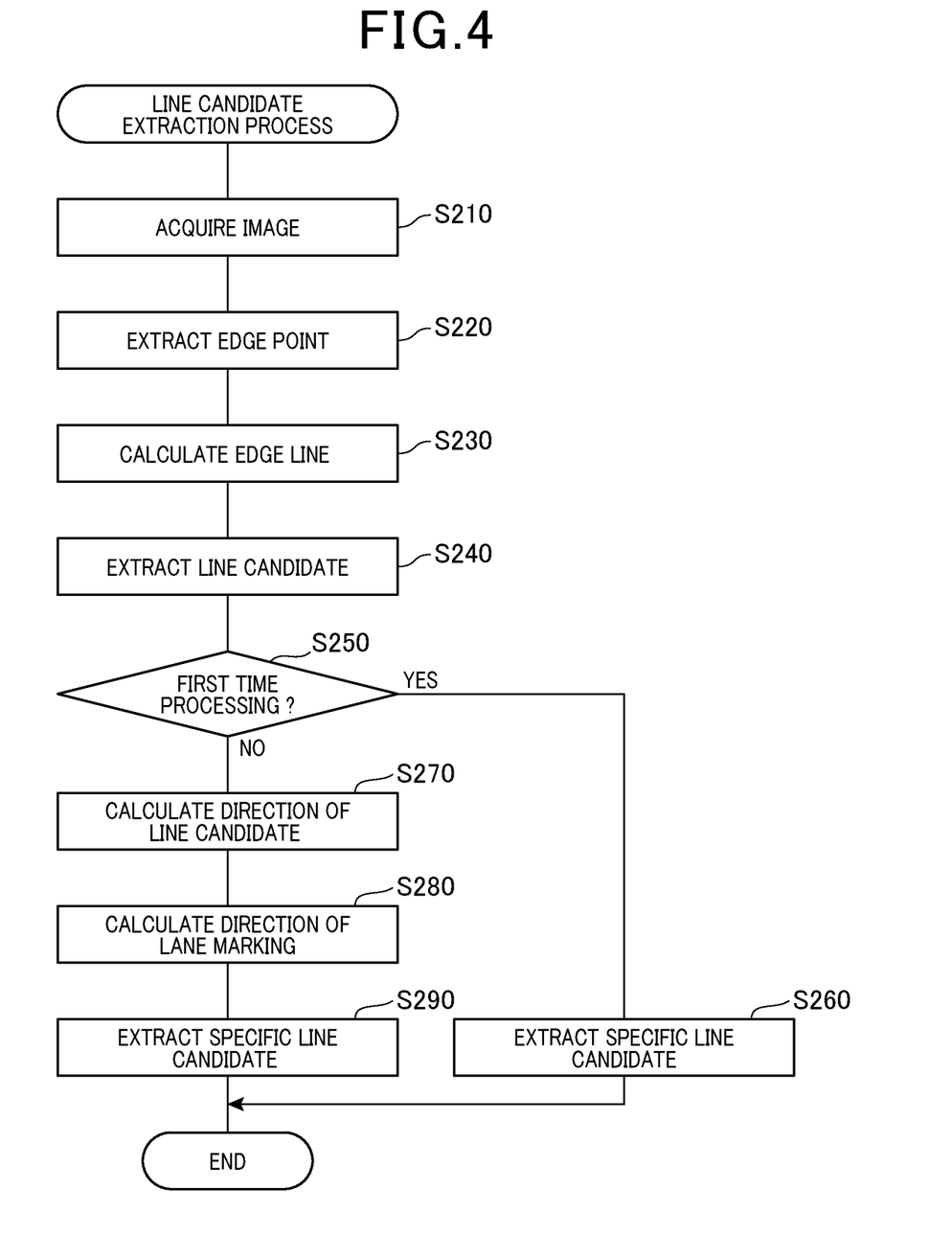
FIG. 4 is a flowchart showing a line candidate extracting process.
Figure 5:
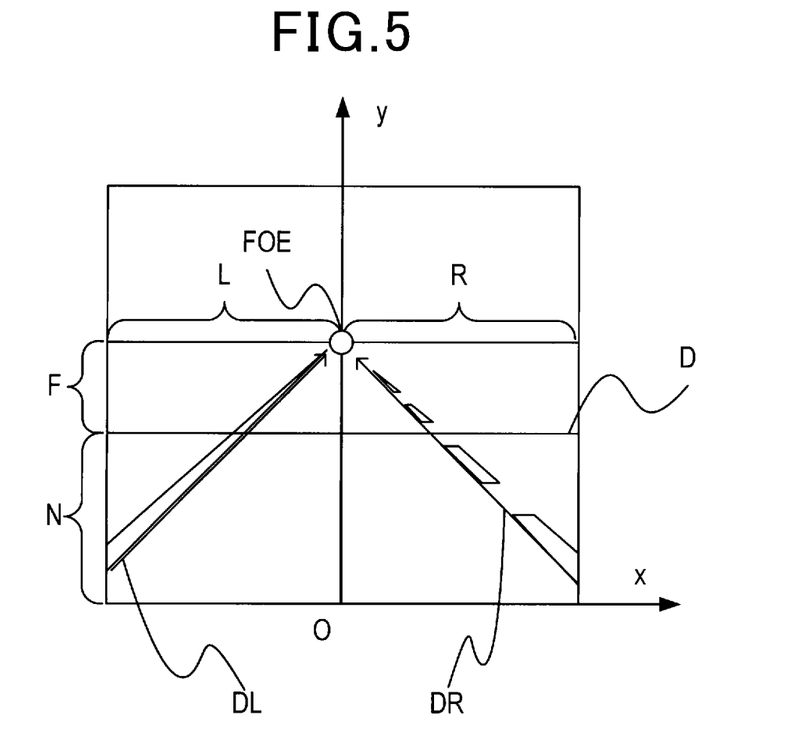
FIG. 5 is a diagram showing an example of a captured image.

At step S210, the driving support apparatus 30 acquires the image captured by the on-vehicle camera 10. An example of an image to be captured is shown in FIG. 5. Hereinafter, the horizontal direction of the image captured such that the lower end portion of the center of the image is defined as the origin O is referred to as x-axis direction, and the vertical direction thereof is referred to as y-axis direction. The captured image may be divided into a plurality of regions. The regions to be divided may be defined, in the captured image, such that the left side with respect to the center position in the x-axis direction of the image is a left region L, and the right side thereof is a right region R. A perspective boundary D is defined as a predetermined boundary line set along the x-axis direction of the captured image and between the vanishing point FOE and the lower end portion in the y-axis direction of the captured image. Then, an upper region with respect to the perspective boundary D may be set as a far region F and a lower region with respect to the perspective boundary D may be set as a near region N. Note that the perspective boundary D may be set in a position on the image among positions where a distance between the camera and the vanishing point is divided into equal length.

Figure 6:
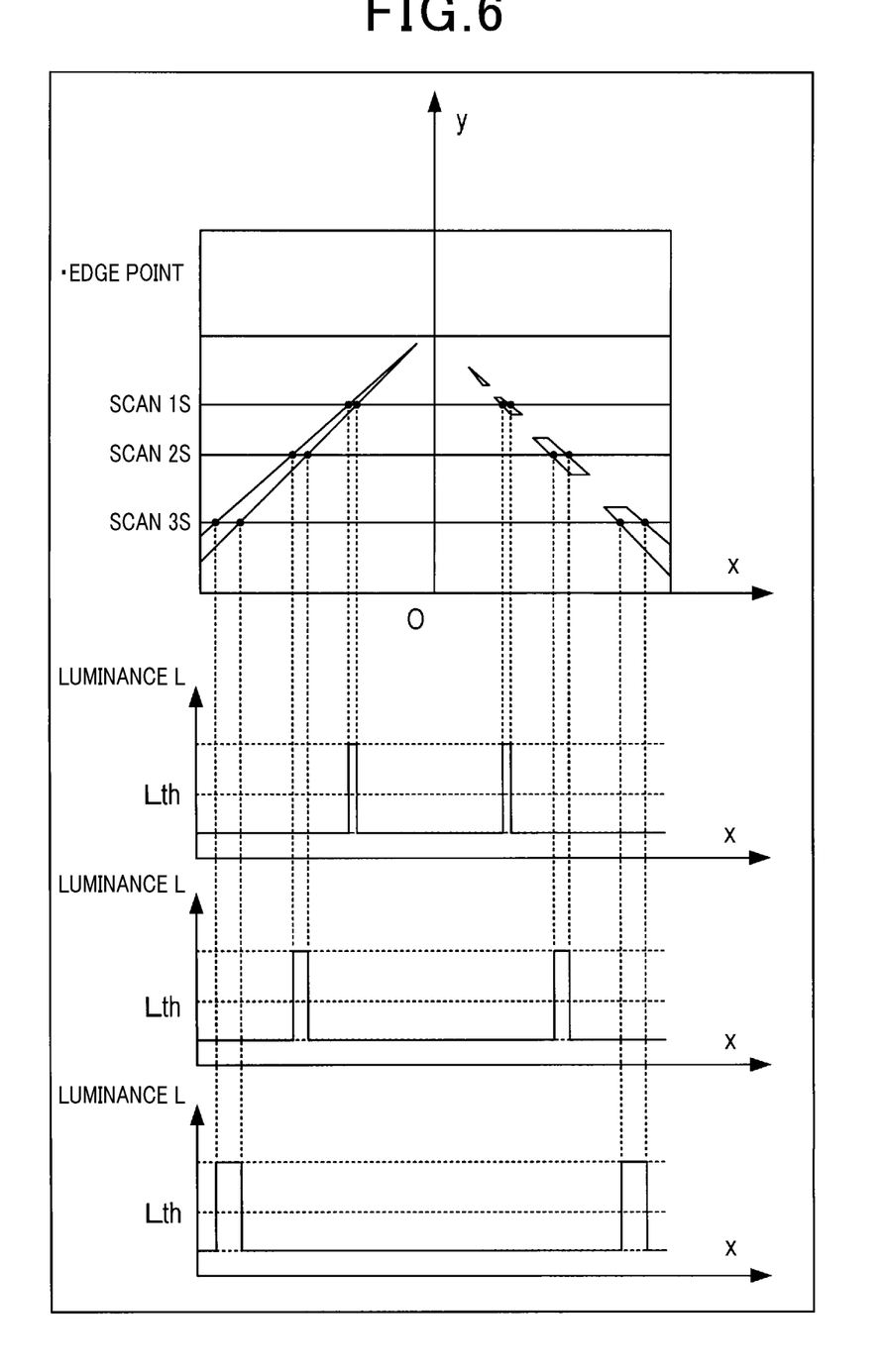
FIG. 6 is a diagram showing edge point extraction.

At step S220, the driving support apparatus 30 extracts edge points. The edge points refer to points in the boundary portion between the marking and other portion. The edge points are extracted in a manner shown in FIG. 6. The driving support apparatus 30 scans the luminance of each pixel on the captured image in a direction from left to right, that is a direction along the vehicle width direction. As a result of scanning, the driving support apparatus 30 recognizes the edge point as a point in which the absolute value of an edge intensity, as a difference of luminance between adjacent pixels shown in FIG. 6, is larger than a predetermined luminance threshold Lth.

Here, among the edge points, edge points changing from low luminance to high luminance towards other end of the image from the origin O indicating the location of the own vehicle when scanning the captured image are referred to as up edge points and edge points changing from high luminance to low luminance towards other end of the image from the origin O is referred to as down edge points.

Figure 7:
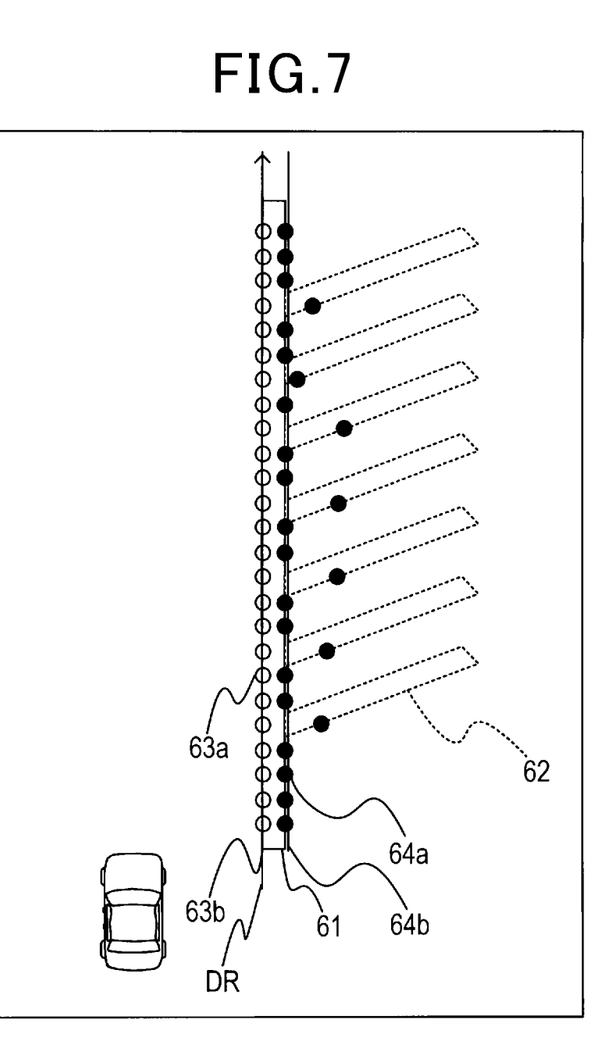
FIG. 7 is a bird's eye view showing a lane marking that constitutes a buffering zone.

For example, as shown in bird's eye view of FIG. 7, up edge points 63a and down edge points 64a are extracted for the markings 61 and oblique lines 62 which constitute a buffering zone located ahead of the vehicle in the right-side thereof.

At step S230, the driving support apparatus 30 acquires an edge line which is a line indicating a distribution of the edge points. In the edge lines, an approximation line indicating the distribution of the up edge points extracted at step S220 is referred to as an up edge line, and an approximation line indicating the distribution of the down edge points is referred to as a down edge line. As a calculation method to obtain the edge line, a known method such as least squares method or Hough transformation is used.

For example, as shown in the bird's eye view of FIG. 7, the up edge line 63b and the down edge line 64 are acquired. At step S240, the driving support apparatus 30 sets the up edge line and the down edge line acquired at step S230 to be paired, and extracts an area surrounded by the up edge line and the down edge line which constitute an edge line pair, to be a line candidate.

The process sets the up edge line and the down edge line to be the edge line pair such that the up edge line and the down edge line satisfies a condition where the positional relationship between the up edge line and the down edge line are mutually adjacent and the up edge line is located closer to the origin O than the down edge line is.

The condition for setting the edge line pair is not limited to the above-described condition. For example, in addition to the above-described condition, a condition where the distance between the up edge line and the down edge line is within a predetermined distance may be used. The predetermined distance may be set to be a distance corresponding to a width of the lane marking indicated on the road, for example.

At step S250, the driving support apparatus 30 determines whether the current driving support process is a first-time processing. When it is determined that the current driving support process is the first-time processing at step S250, the driving support apparatus 30 proceeds to step S260.

At step S260, the driving support apparatus 30 extracts line candidates extracted at step S240 as specific line candidates and terminates the line candidate extracting process. On the other hand, when it is determined that the current driving support process is not the first-time processing, the driving support apparatus 30 proceeds to step S270.

At step S270, the driving support apparatus 30 calculates a direction of each line candidate extracted at step S240. The direction of the line candidate refers to, for example, in the captured image, a tangential line direction of a point at which a line extending in the horizontal direction along the center position with respect to the up-down direction crosses the line candidate, and an upward direction from the bottom of the captured image. Note that the point for calculating the tangential direction is not limited to the point at which a line extending in the horizontal direction along the center line positioned with respect to the up-down direction crosses the line candidate. However, for example, a line may be used which extends in the horizontal direction along a line positioned at one third of the height in the up-down direction of the captured image. Moreover, the direction of the line candidate is not limited to the one defined based on the tangential direction. For example, a direction of the up edge line 63b or the down edge line 64b which constitute the line candidate and an upward direction from the bottom of the captured image may be used as a direction of the line candidate. Note that the method for calculation of the direction is also applied to the lane marking directions DR, DL calculated at step S280 which will be described later.

At step S280, the driving support apparatus 30 calculates the directions DR, DL of the lane marking. The directions DR, DL of the lane marking refers to a tangential line direction of the setting line candidate which is set at step S440 or S490 as a line candidate indicating the lane marking of the own vehicle. Each of processes of the steps S440 and S490 refer to a boundary setting process which will be described later. The directions DR, DL of the lane marking are not limited to the tangential line direction of the setting line candidate. For example, it may use a direction in which the tangential line direction of the setting line candidate is shifted by a traveling distance during the travelling period of the own vehicle. Also, the directions DR, DL of the lane marking are not limited to tangential line directions of the setting line candidate. However, it may use a direction of the up edge line 63b or the down edge line 64b which constitute the line candidate and an upward direction from the bottom of the captured image, to be the directions DR, DL of the lane marking.

The travelling period is defined as a period from a time when the setting line candidate is extracted which is set to be the lane boundary line in the previous driving support process to a time when the process at step S280 is executed in the driving support process. The travelling distance of the own vehicle may be calculated based on the travelling speed measured by the sensors mounted on the own vehicle, an acceleration factor and a yaw rate.

Moreover, the directions DR, DL of the lane marking is obtained, in the captured image shown in FIG. 5, one by one for each of the left region L and the right region R. Note that a direction of the lane marking existing in the left side with respect to the own vehicle is referred to as DL and a direction of the lane marking existing in the right side with respect to the own vehicle is referred to as DR.

The specific line candidate is extracted in the following manner. Among the line candidates extracted at step S240, the process extracts, as the specific line candidate, a line candidate which satisfies a condition where a difference of angles between the direction of the line candidate calculated at step S270 and the directions DR, DL of the lane marking calculated at step S280 is within a predetermined extraction angle. The extraction angle refers to an angle where the direction of the line candidate and the directions DL, DR of the lane marking can be regarded as approximately the same when considering a measurement error of the sensors 20 and an estimation error The process of step S220 corresponds to a process of an edge point extraction unit, the process of step S230 corresponds to a process of an edge line calculation unit, and the process of step S240 corresponds to a process of a line candidate extraction unit.

Figure 8:
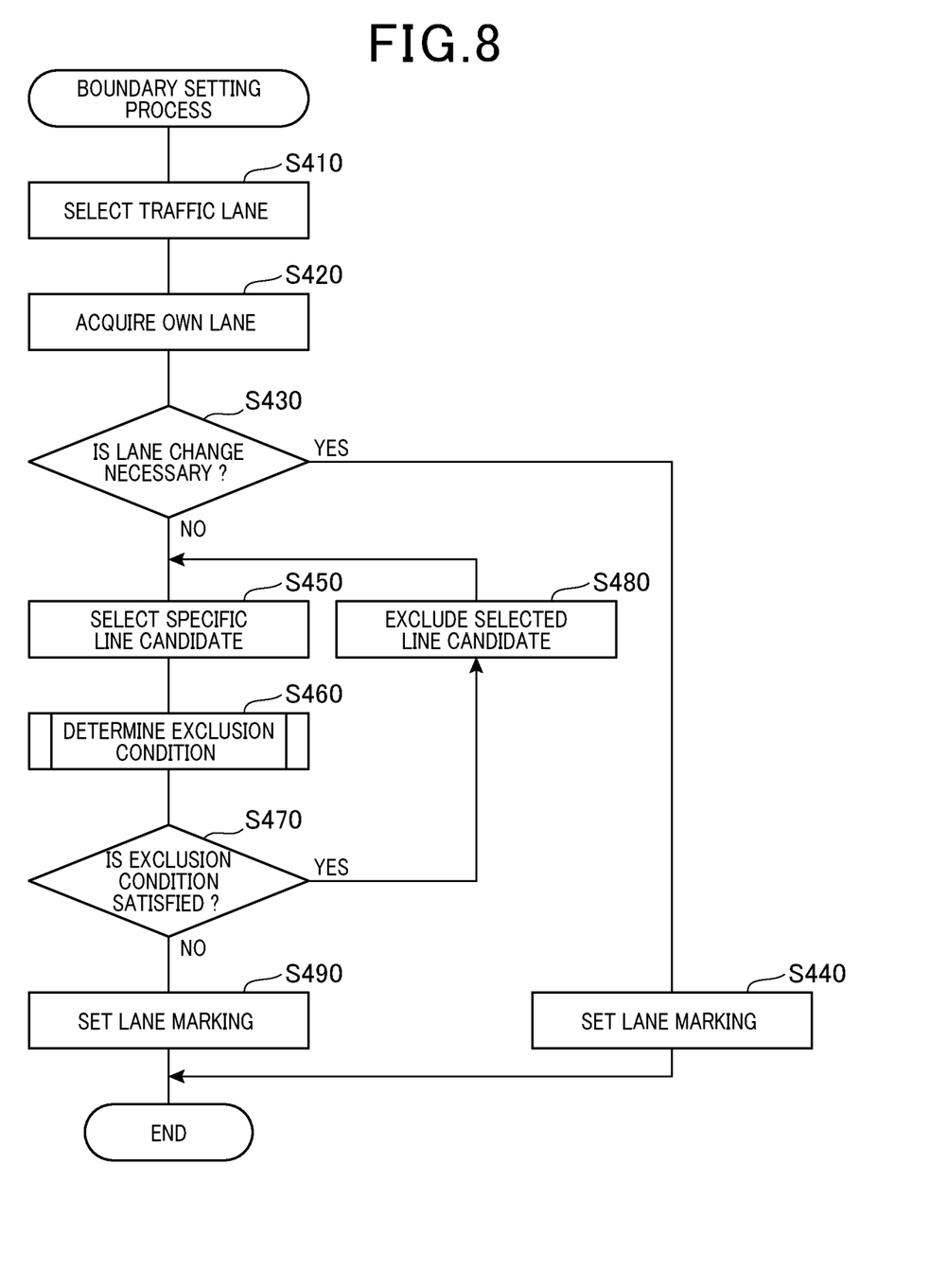
FIG. 8 is a flowchart showing a boundary setting process.

Next, a boundary setting process executed by the driving support apparatus 30 at step S120 will be described with reference to a flowchart shown in FIG. 8.

At step S410, the driving support apparatus 30 acquires a travelling route and selects a traffic lane (i.e. selected lane). The selected lane refers to a lane where the own vehicle is scheduled to travel on the travelling route. Note that the travelling route and the selected lane are set by the navigation system 50 depending on the destination stored in the navigation system 50 which is inputted by the driver of the own vehicle.

At step S420, the driving support apparatus 30 acquires the position data of the own vehicle. The position data of the own vehicle is acquired based on the position of the own vehicle indicated by the GNSS receiver 51 and the information about the traffic lane stored in the map memory 52.

At step S430, the driving support apparatus 30 determines, based on the selected lane set at step S410 and the position of the own vehicle acquired at step S420, whether a lane change is necessary or not. The case where the lane change is necessary refers to, for example, a case where a traffic lane of the own vehicle or a traffic lane where the own vehicle travels is a right-turn exclusive lane and the selected lane is a traffic lane indicating straight-through travelling.

The driving support apparatus 30 proceeds to step S440 when it is determined at step S430 that the lane change is necessary. At step S440, the driving support apparatus 30 sets a specific line candidate located at the most closely to the own vehicle to be the lane boundary line and terminates the boundary setting process.

On the other hand, the driving support apparatus 30 proceeds to step S450, when it is determined at step S430 that the lane change is not necessary. At step S450, the driving support apparatus 30 selects a specific line candidate located at the most closely to the own vehicle in the specific line candidates. Note that the line candidate which is selected is referred to as a selected line candidate.

At step S460, the driving support apparatus 30 performs an exclusion condition determination process. The exclusion condition determination process determines whether an exclusion condition where a selected candidate has been set in advance, is satisfied or not. The exclusion condition is a condition that excludes a selected line candidate from the lane boundary line.

At step S470, the driving support apparatus 30 determines whether the selected line candidate satisfied the exclusion condition at the step S460. When it is determined that the exclusion condition is satisfied for the selected line candidate at step S470, the driving support apparatus 30 proceeds to step S480.

At S480, the driving support apparatus excludes the selected line candidate from the specific line candidate. Then, the driving support apparatus 30 moves the process to step S450, and executes subsequent processes. In other words, by executing the processes through steps S450 to S480, a specific line candidate that satisfies the exclusion condition is excluded from candidates representing the lane markings.

Meanwhile, when it is determined that the selected line candidate does not satisfy the exclusion condition, the driving support apparatus 30 moves the process to step S490. At step S490, the driving support apparatus 30 sets the selected line candidate to be a setting line candidate as a line candidate representing the lane markings. Note that step S410 corresponds to processes of a route acquisition unit and a lane selecting unit.

Figure 9:
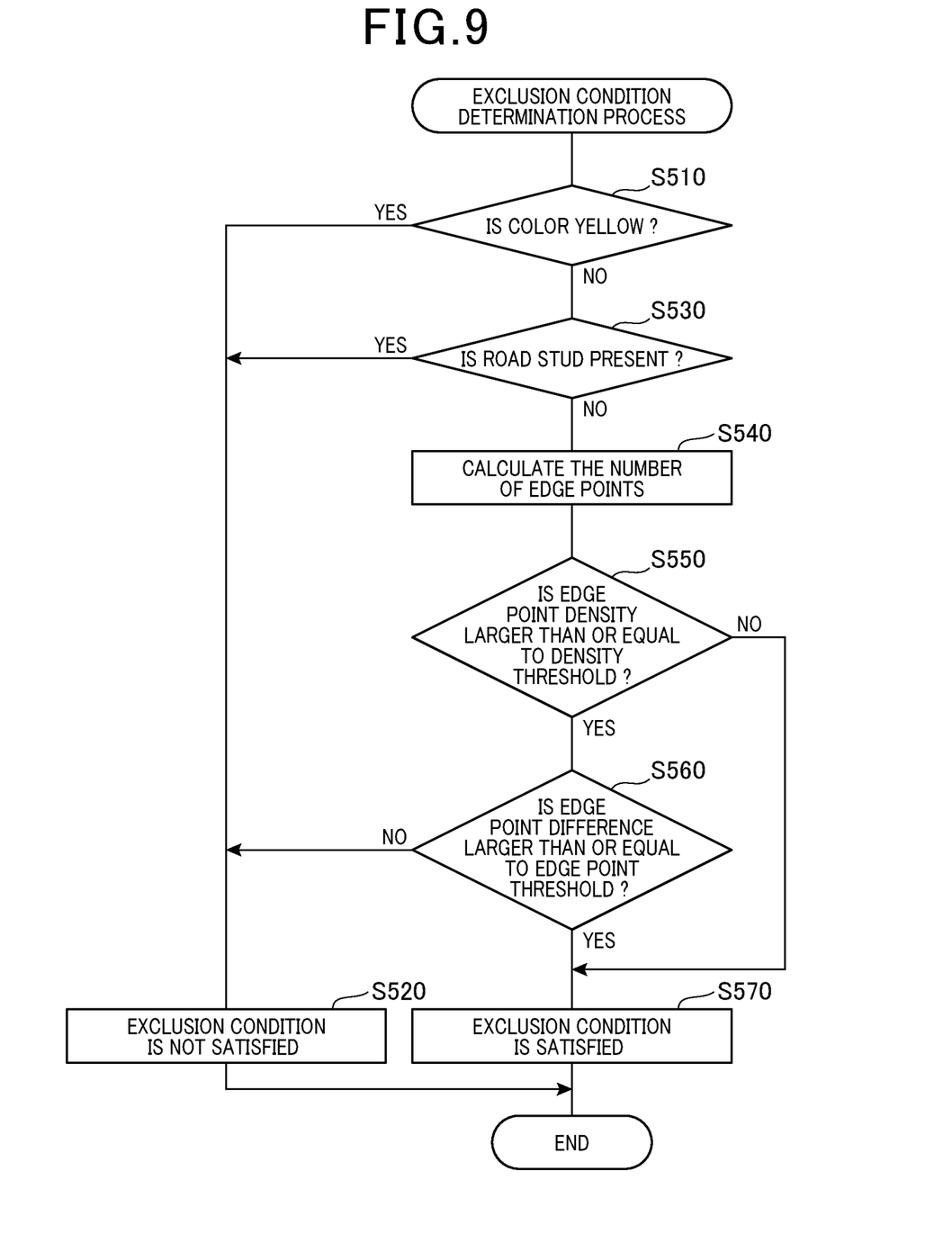
FIG. 9 is a flowchart showing an exclusion condition determination process.

Next, with reference to FIG. 9, an exclusion condition determination process to be executed at step S460 will be described in detail.

At S510, the driving support apparatus 30 determines whether the color of the selected line candidate is yellow. Here, the color of the selected line candidate refers to color indicated by the color information of pixels in a range where the selected line candidates are present in the captured image.

Here, the color used for the determination is not limited to yellow, but any color can be used as long as the color from which the lane marking can be recognized, when the color is selected for the selected line candidate. When it is determined that the color of the selected line candidate is yellow, the driving support apparatus 30 proceeds to step S520.

At step S520, the driving support apparatus 30 determines that the selected line candidate does not satisfy the exclusion condition and terminates the process. When it is determined that the color of the selected line candidate is not yellow, the driving support apparatus proceeds to step S530.

At step S530, the driving support apparatus 30 determines whether the road stud provided on the road in a determination range which is determined in the captured image in advance. The determination range may be set to be a range in the vicinity of the selected line candidate. Note that the range in the vicinity of the selected line candidate refers to a range within 10 pixels in the x-axis direction of the capture image with respect to the selected line candidate, for example.

The method for determining whether a road stud is present may be a known method such as pattern matching. When the pattern matching is used for the determination, for example, an image of the road stud is stored in the memory unit 32 in advance, and the road image may be compared with the image of the road stud stored in the memory unit 32. Note that the determination whether a road stud is present is not limited to the pattern matching, but may be various known methods such as a determination based on the shape and the color, a structure from motion in which a three-dimensional shape is restored from a plurality of images, an image recognition based on the machine learning.

When it is determined that the road stud is present, the driving support apparatus proceeds to step S520. When it is determined that the road stud is not present, the driving support apparatus proceeds to step S540.

At step S540, the driving support apparatus 30 calculates the number of up edge points and down edge points which belong to the selected line candidates. The edge points belonging to the selected line candidates refers to edge points used for obtaining edge lines which constitute the selected line candidates. The calculation of the number of up edge points is performed by calculating the number of up edge points which belong to the up edge lines constituting the selected line candidates. Similarly, the calculation of the number of down edge points is performed by the driving support apparatus 30 where the number of down edge points belonging to the down edge line constituting the selected line candidates is calculated.

At step S550, the driving support apparatus 30 determines whether the edge point density is larger than or equal to a predetermined density threshold. The edge point density refers to the number of edge points per length of the line candidate. Here, the length of the line candidate may be a length in real space or may be a length in the captured image. For the number of edge points, a sum of the number of up edge points and the number of down edge points, or alternatively, the number of up edge points and the number of down edge points may be calculated separately.

The density threshold refers to a threshold used to determine whether the line indicated by the line candidate disappears due to blurring or the like. The density threshold is set, at step S560 which will be described later, to be a value from which the number of up edge points and the number of down edge points can be calculated significantly. The density threshold may be individually set for each of the up edge points and the down edge points, or may be set for the sum of the number of up edge points and the number of the down edge points.

At step S550, when it is determined that the edge point density is larger than or equal to the density threshold, the driving support apparatus 30 proceeds to step S560. On the other hand, when it is determined that the edge point density is less than the density threshold, the driving support apparatus 30 proceeds to step S570.

At step S560, the driving support apparatus 30 determines whether an edge point difference which is a difference between the number of up edge points and the number of down edge points is larger than or equal to a predetermined point threshold. The point threshold is set to be a value capable of determining whether the selected line candidate constitutes the buffering zone.

At step S560, when it is determined that the edge point difference is not larger than nor equal to the point threshold, the driving support apparatus 30 proceeds to step S520. At step S560, when it is determined that the edge point difference is larger than or equal to the point threshold, the driving support apparatus 30 proceeds to step S570.

At step S570, the driving support apparatus 30 determines that the selected line candidate satisfies the exclusion condition and terminates the process. Note that the step S510 corresponds to a process of color determination unit, and step S530 corresponds to a process of a road stud detecting unit.

According to the above-described embodiments, the following effects can be obtained. The driving support system of the present embodiment determines whether the line candidate included in the captured image indicate the buffering zone by using a parameter of the line candidate which can be determined in the captured image. Here, the parameter of the line candidate which can be determined in the captured image indicates a difference between the number of up edge points and the number of down edge points which belong to the line candidate, the color of the line candidate, and represents whether the road stud is present in the vicinity of the line candidate. Hence, the captured image is not required to be converted into the bird's eye view. Thus, a processing load for converting into the bird's eye view can be reduced.

The embodiments of the present disclosure have been described. The present disclosure is not limited to the above-described embodiments, but may be modified in various ways.

The up edge points are detected at points of which the luminance significantly changes towards the end portion of the image from a side close to the origin O. Also, down edge points are detected at points of which the luminance changes from a close side of the origin O towards a far side thereof. However, this is not limited thereto.

For example, a configuration may be employed to extract an up edge point in the previous line candidate extracting process, which is an edge point located at a position moved from the position of the extracted up edge point by a moving distance derived based on a measurement value of the sensors 20. Similarly, a configuration may be employed to extract a position of a down edge point.

According to the above-described embodiments, when it is determined, at step S560, that the edge point density is less than the density threshold, and when it is determined, at step S560, that the edge point difference is larger than or equal to the point threshold, the process determines that the exclusion condition is satisfied. However, the exclusion condition is not limited thereto. For example, the process may determine that the exclusion condition is satisfied, when the location of the buffering zone included in the road information of the car navigation system 50 and the location of the line candidates on the map detected from the own vehicle location detected by the GNSS receiver 51 are at the same location. Also, the exclusion condition may include, for example, conditions where the line candidates represent the buffering zone or the like.

The process for acquiring the location of the buffering zone included in the road information of the car navigation system 50 corresponds to a process of a buffering zone acquiring unit, and the process of acquiring the location of the line candidates on the map based on the location of the vehicle corresponds to a line location acquiring unit.

A plurality of functions included in a single element of the above-described embodiments may be achieved by a plurality of elements, or one function included in a single element may be achieved by a plurality of elements. A plurality of functions included in a plurality of elements may be achieved by a single element, or a function achieved by a plurality of elements may be achieved by a single element. Also, a part of configurations of the above-described embodiments can be omitted. At least part of the above-described configuration may be added to other configuration of the above-described embodiments, or may replace other configuration of the above-described embodiments. It should be noted that various aspects inherent in the technical ideas identified by the scope of claims are defined as embodiments of the present disclosure.

The present disclosure can be accomplished by various modes, other than the above-described driving support system, such as a system including the driving support system as constituent, a program executed on a computer to allow the computer to serve as the driving support system, a non-transitory tangible recording media storing the program such as semiconductor memory, and a driving support method.

What is claimed is:

1. A computer-implemented method for providing driving support of a vehicle by controlling a steering of the vehicle based on a position of a lane boundary indicating a boundary of an own lane where the vehicle is travelling, the computer-implemented method comprising:

extracting an edge point, in which a scanning direction is defined as a direction corresponding to a vehicle width direction in a captured image where a road surface ahead of the vehicle is captured, a luminance difference is defined as a difference between luminance of adjacent pixels in a pixel column, which is pixels arranged along the scanning direction, and the edge point is defined as the adjacent pixels having an absolute value of the luminance difference, which is larger than a predetermined luminance threshold;

calculating an up edge line and a down edge line, the up edge line comprising an approximation line of a distribution of a plurality of up edge points and the down edge line comprising an approximation line of a distribution of a plurality of down edge points, wherein a vehicle position is defined as a position of the vehicle in the captured image, an outer pixel is defined as a pixel located in a far side from the vehicle position with respect to the edge point, an inner pixel is defined as a pixel located in a near side from the vehicle position with respect to the edge point, an up edge point is defined as the edge point where a luminance of the inner pixel is smaller than a luminance of the outer pixel, and a down edge point is defined as the edge point where the luminance of the outer pixel is smaller than the luminance of the inner pixel;

extracting an area surrounded by the up edge line and the down edge line which are adjacent to each other to be a line candidate, the adjacent up edge line being located relatively close to the vehicle position and the adjacent down edge line being located relatively far from the vehicle position;

determining a lane marking among a plurality of line candidates excluding the line candidate that satisfies an exclusion condition that is predetermined, the lane marking being the line candidate located most closely to the vehicle position along the vehicle width direction as a line indicating a position and a shape of a boundary of a traffic lane; and performing a steering control of the vehicle such that the vehicle travels along the position and the shape of the lane marking determined, wherein the exclusion condition includes a condition where a number of edge points belonging to the up edge line constituting the line candidate is larger than or equal to a predetermined point threshold, compared to the number of edge points belonging to the down edge line constituting the line candidate.

2. The computer-implemented method according to claim 1, further comprising:
acquiring a location of a buffering zone indicated by map data; and
acquiring a location of the line candidate on a map based on the position of the vehicle, wherein
the exclusion condition includes a condition where a location of the line candidate on the map corresponds to a location of the buffering zone.

3. The computer-implemented method according to claim 1, further comprising:
detecting a road stud provided on a road where the vehicle included in the captured image is travelling; and
determining, including the line candidate satisfying the exclusion condition, the line candidate located closer to the vehicle position than the road stud detected with respect to the vehicle width direction, to be the lane marking.

4. The computer-implemented method according to claim 1, wherein
the captured image includes color information representing color to be displayed for each pixel; and
the computer-implemented method further comprises:
determining the line candidate to be the lane marking, in response to a color represented by the color information of a pixel indicating the line candidate included in the captured image is a predetermined color that indicates the lane marking.

5. The computer-implemented method according to claim 1, further comprising:
acquiring a travelling route where the vehicle travels and selecting a traffic lane where the vehicle travels to be a selected lane in response the vehicle traveling on the travelling route that is acquired; and
determining, including the line candidate satisfying the exclusion condition, the line candidate located most closely to the vehicle position with respect to the vehicle width direction in response to the selected lane and the traffic lane where the vehicle travels being different.

6. A driving support apparatus mounted on a vehicle and configured to control a steering of the vehicle based on a position of a lane boundary indicating a boundary of an own lane where the vehicle is travelling, the driving support apparatus comprising:
a processor;
a non-transitory computer-readable storage medium; and
a set of computer-executable instructions stored on the non-transitory computer-readable storage medium that cause the processor to:
extracting an edge point, in which a scanning direction is defined as a direction corresponding to a vehicle width direction in a captured image where a road surface ahead of the vehicle is captured, a luminance difference is defined as a difference between luminance of adjacent pixels in a pixel column, which is pixels arranged along the scanning direction, and the edge point is defined as the adjacent pixels having an absolute value of the luminance difference, which is larger than a predetermined luminance threshold;
calculating an up edge line and a down edge line, the up edge line comprising an approximation line of a distribution of a plurality of up edge points and the down edge line comprising an approximation line of a distribution of a plurality of down edge points, wherein a vehicle position is defined as a position of the vehicle in the captured image, an outer pixel is defined as a pixel located in a far side from the vehicle position with respect to the edge point, an inner pixel is defined as a pixel located in a near side from the vehicle position with respect to the edge point, an up edge point is defined as the edge point where a luminance of the inner pixel is smaller than a luminance of the outer pixel, and a down edge point is defined as the edge point where the luminance of the outer pixel is smaller than the luminance of the inner pixel;
extracting an area surrounded by the up edge line and the down edge line which are adjacent to each other to be a line candidate, the adjacent up edge line being located relatively close to the vehicle position and the adjacent down edge line being located relatively far from the vehicle position;
determining a lane marking among a plurality of line candidates excluding the line candidate that satisfies an exclusion condition that is predetermined, the lane marking being the line candidate located most closely to the vehicle position along the vehicle width direction as a line indicating a position and a shape of a boundary of a traffic lane; and performing a steering control of the vehicle such that the vehicle travels along the position and the shape of the lane marking determined, wherein the exclusion condition includes a condition where a number of edge points belonging to the up edge line constituting the line candidate is larger than or equal to a predetermined point threshold, compared to the number of edge points belonging to the down edge line constituting the line candidate.

7. The driving support apparatus according to claim 6, wherein the set of computer-executable instructions further cause the processor to acquire a location of a buffering zone indicated by map data, and to acquire a location of the line candidate on a map based on the position of the vehicle; and the exclusion condition includes a condition where a location of the line candidate on the map corresponds to a location of the buffering zone.

8. The driving support apparatus according to claim 6, wherein the set of computer-executable instructions further cause the processor to:

detect a road stud provided on a road where the vehicle included in the captured image is travelling; and determine, including the line candidate satisfying the exclusion condition, the line candidate located closer to the vehicle position than the road stud detected with respect to the vehicle width direction, to be the lane marking.

9. The driving support apparatus according to claim 6, wherein the captured image includes color information representing color to be displayed for each pixel; and the set of computer-executable instructions further cause the processor to determine the line candidate to be the lane marking, when a color represented by the color information of a pixel indicating the line candidate included in the captured image is a predetermined color that indicates the lane marking.

10. The driving support apparatus according to claim 6, wherein the set of computer-executable instructions further cause the processor to:

acquire a travelling route where the vehicle travels and select a traffic lane where the vehicle travels to be a selected lane when the vehicle travels on the travelling route that is acquired; and determine, including the line candidate satisfying the exclusion condition, the line candidate located most closely to the vehicle position with respect to the vehicle width direction when the selected lane and the traffic lane where the vehicle travels are different.

* * * * *